(12) United States Patent  
Mitamura et al.

(10) Patent No.: US 12,510,714 B2  
(45) Date of Patent: Dec. 30, 2025

(54) OPTICAL INTEGRATED CIRCUIT MODULE AND OPTICAL COMMUNICATION APPARATUS

(71) Applicant: FUJITSU OPTICAL COMPONENTS LIMITED, Kawasaki (JP)

(72) Inventors: Nobuaki Mitamura, Saitama (JP); Yohei Yamashita, kodaira (JP); Yurika Yanada, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 277 days.

(21) Appl. No.: 18/482,126

(22) Filed: Oct. 6, 2023

(65) Prior Publication Data

US 2024/0159978 A1  May 16, 2024

(30) Foreign Application Priority Data

Nov. 16, 2022  (JP) .................. 2022-183739

(51) Int. Cl.
*G02B 6/42* (2006.01)
*G02F 1/01* (2006.01)

(52) U.S. Cl.
CPC ......... *G02B 6/4251* (2013.01); *G02F 1/0107* (2013.01)

(58) Field of Classification Search
CPC ............................ G02B 6/4251; G02F 1/0107
USPC ..................... 385/1–4, 7–10, 14, 147
See application file for complete search history.

(56) References Cited

U.S. PATENT DOCUMENTS

| 7,643,714 | B2 | 1/2010 | Hochberg et al. | |
|---|---|---|---|---|
| 9,099,679 | B2* | 8/2015 | MacKenzie | H10K 59/8722 |
| 2002/0181866 | A1 | 12/2002 | Crook et al. | |
| 2011/0050045 | A1* | 3/2011 | Aratake | H03H 9/21 |
| | | | | 29/25.35 |
| 2011/0115056 | A1* | 5/2011 | Baillin | H01L 23/26 |
| | | | | 257/617 |
| 2012/0106085 | A1* | 5/2012 | Yamazaki | H01L 23/057 |
| | | | | 361/767 |
| 2015/0243799 | A1 | 8/2015 | Chiang et al. | |
| 2016/0154178 | A1* | 6/2016 | Jaeger | G02B 6/12004 |
| | | | | 438/24 |

(Continued)

FOREIGN PATENT DOCUMENTS

| JP | 2000-337959 | 12/2000 |
|---|---|---|
| JP | 2001-281050 | 10/2001 |

(Continued)

OTHER PUBLICATIONS

Daniele Rezzonico et al., "Photostability studies of π-conjugated chromophores with resonant and nonresonant light excitation for long-life polymeric telecommunication devices", J. Opt. Soc. Am. B, vol. 24, No. 9, pp. 2199-2207, Aug. 14, 2007.

*Primary Examiner* — Robert Tavlykaev

(74) *Attorney, Agent, or Firm* — STAAS & HALSEY LLP

(57) ABSTRACT

An optical integrated circuit module includes an optical integrated circuit element that includes as optical waveguide that is made by using an organic electro-optical material, and a cover that seals, as vacuum sealing, at least the optical waveguide that is disposed on the optical integrated circuit element. In addition, the optical integrated circuit module includes an oxygen getter that is provided in an inner part of the cover and that absorbs oxygen contained in the inner part of the cover.

11 Claims, 13 Drawing Sheets

(56) References Cited

U.S. PATENT DOCUMENTS

2019/0085199 A1    3/2019  Yokoyama et al.
2021/0072569 A1*   3/2021  Mitamura ............. G02F 1/0316

FOREIGN PATENT DOCUMENTS

| JP | 2013-171958 | 9/2013 |
| JP | 2019-053313 | 4/2019 |
| WO | WO 2017/159815 A1 | 9/2017 |

* cited by examiner

OPTICAL INTEGRATED CIRCUIT MODULE AND OPTICAL COMMUNICATION APPARATUS

CROSS-REFERENCE TO RELATED APPLICATION

This application is based upon and claims the benefit of priority of the prior Japanese Patent Application No. 2022-183739, filed on Nov. 16, 2022, the entire contents of which are incorporated herein by reference.

FIELD

The embodiments discussed herein are related to an optical integrated circuit module and optical communication apparatus.

BACKGROUND

Development of communication devices or equipment for supporting a rapid increase in capacity of optical data transmission is becoming an urgent need. An optical modulator is a core part of high-speed data transmission, and it is desirable to speed up transmission performed at 800 Gbit/sec (at a symbol rate of 130 G baud) by industry. As a material of an optical modulator, an organic electro-optical material (electro-optical polymer) that has better electro-optical effect and broadband characteristics and that is alternative to lithium niobate ($LiNbO_3$) that has been the mainstream until now is expected. An optical modulator that is constituted to use a slot waveguide in which an electro-optical polymer is applied and filled between two electrodes has been proposed (for example, see U.S. Pat. No. 7,643,714). A practical use of the electro-optical polymer material is less advanced due to concern about reliability, but an organic non-linear optical material that is able to hold electro-optic constant exhibited in reliability test (for example, 85° C., 2000 hours) has been proposed (for example, see Japanese Patent No. 6935884).

It has been reported that, if strong light having an optical communication wavelength of 1550 nm band is made to pass through the electro-optical polymer in the atmosphere, that is, in a state in which oxygen is present, the polymer itself is degraded and the modulation characteristics or the optical characteristics are degraded (for example, see D. Rezzonico, M. Jazbinsek, P. Gunter, C. Bosshard, D. H. Bale, Y. Liao, L. R. Dalton, and P. J. Reid, "Photostabililty studies of pi-conjugated chromophores with resonant and nonresonant light excitation for long-life polymeric telecommunication devices," J. Opt. Soc. Am. B., vol. 24, no. 9, pp. 2199-2207, 2007). A degradation phenomenon caused by oxygen is referred to as a photo-oxidation phenomenon. To practically use an electro-optical polymer waveguide, the photo-oxidation phenomenon needs to be considered. There is a known structure in which a $LiNbO_3$ optical modulator is hermetically sealed (for example, see Japanese Laid-open Patent Publication No. 2019-53313).

Patent Document 3: Japanese Laid-open Patent Publication No. 2019-53313
Patent Document 4: Japanese Laid-open Patent Publication No. 2000-337959
Patent Document 5: U.S. Patent Application Publication No. 2015/0243799
Patent Document 6: U.S. Patent Application Publication No. 2002/0181866
Patent Document 7: Japanese Laid-open Patent Publication No. 2013-171958
Patent Document 8: Japanese Laid-open Patent Publication No. 2001-281050
Non-Patent Document 1: D. Rezzonico, M. Jazbinsek, P. Gunter, C. Bosshard, D. H. Bale, Y. Liao, L. R. Dalton, and P. J. Reid, "Photostabililty studies of pi-conjugated chromophores with resonant and nonresonant light excitation for long-life polymeric telecommunication devices," J. Opt. Soc. Am. B., vol. 24, no. 9, pp. 2199-2207, 2007

The inventors have found that, even if a known hermetic seal structure is applied to an optical integrated circuit including a slot waveguide that is made by using an organic electro-optical material, such as an electro-optical polymer material, it is not possible to obtain the characteristic capable of meeting a practical use. Even if the optical integrated circuit that includes the slot waveguide that is made by using the electro-optical polymer material is adhesively secured inside a hermetic seal package by using an adhesive agent, moisture is volatilized as much as possible by performing baking or the like, and a hermetic seal is performed in an atmosphere of nitrogen, certain amounts of oxygen and moisture remain in the package. The conceivable reason for this is that the electro-optical polymer material or the adhesive agent absorbs oxygen, air, moisture, and the like, and thus, the absorbed oxygen and moisture are not sufficiently volatilized even if baking is performed and consequently remain in the hermetic seal package.

SUMMARY

According to an aspect of an embodiment, an optical integrated circuit module includes an optical integrated circuit element, a cover and an oxygen getter. The optical integrated circuit element includes an optical waveguide that is made by using an organic electro-optical material. The cover seals, as vacuum sealing, at least the optical waveguide that is disposed on the optical integrated circuit element. The oxygen getter is provided in an inner part of the cover and that absorbs oxygen contained in the inner part of the cover.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 13:
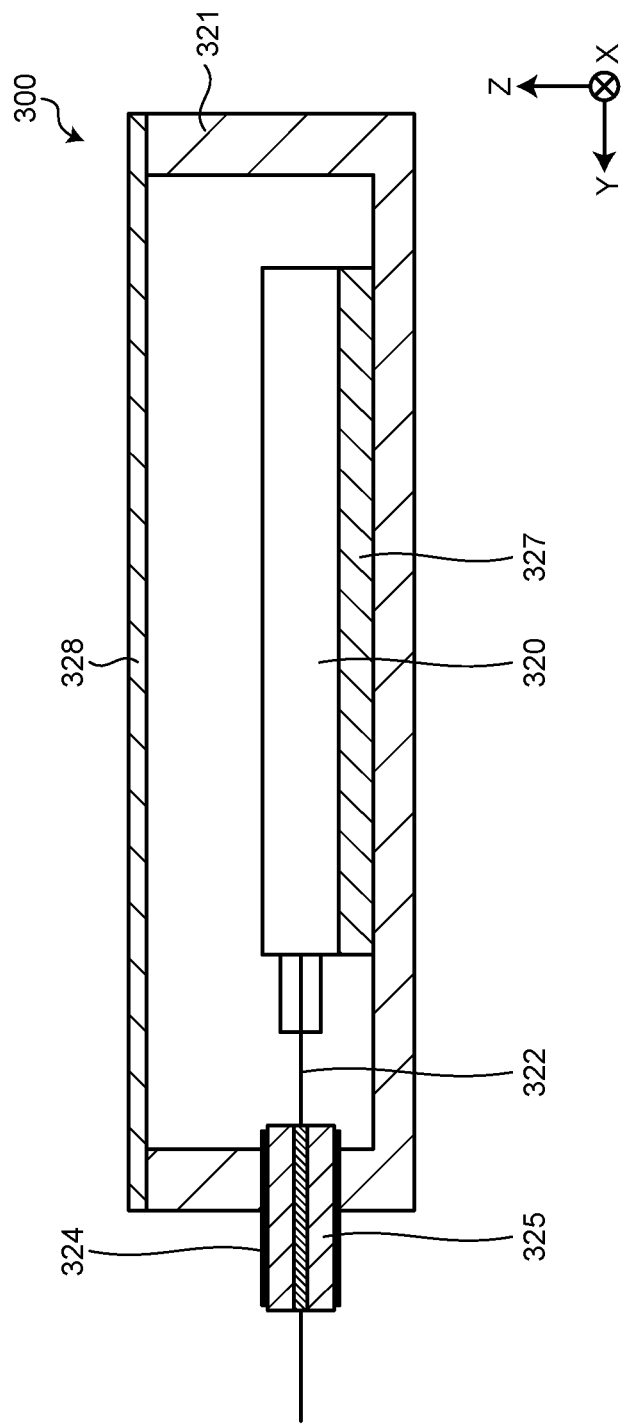
FIG. 13 is a cross-sectional schematic diagram illustrating an optical integrated circuit module according to a comparative example.

First, before an optical integrated circuit module according to the present embodiment is described, an optical integrated circuit module that is used in a comparative example and that includes a slot waveguide that is made by using an electro-optical polymer will be described. FIG. 13 is a cross-sectional schematic diagram illustrating an optical integrated circuit module 300 according to the comparative example.

The optical integrated circuit module 300 illustrated in FIG. 13 includes an optical integrated circuit element 320 that includes a slot waveguide that is made by using an electro-optical polymer, and a package 321 that hermetically seals the optical integrated circuit element 320. In the package 321, the optical integrated circuit element 320 is secured by an adhesive agent 327. In the slot waveguide that is made by using the electro-optical polymer, for example, an optical element, such as an optical modulator, is formed. The package 321 is covered by a lid 328, and the inner part of the package 321 is in an airtight state by nitrogen. An optical fiber 322 that is optically connected to the optical integrated circuit element 320 is drawn out to the outside of the package 321 by passing through a pipe 324 that is used for the hermetic seal. A solder material 325 is filled between the pipe 324 and the package 321, and the circumference of the optical fiber 322 is also hermetically sealed.

When the optical integrated circuit module 300 is assembled, after the optical integrated circuit element 320 has been secured to an inner part of the package 321 by the adhesive agent 327, moisture is volatilized as much as possible by performing baking in a vacuum, and subsequently, a seam welding process is performed on the lid 328 in an atmosphere of nitrogen substitution such that the lid 328 is welded on to an opening that is located on the top surface of the package 321. Furthermore, a portion around the optical fiber 322 that is drawn out from the pipe 324 to the outside is filled with the solder material 325. Accordingly, it is possible to obtain the optical integrated circuit module 300 that is hermetically sealed by nitrogen gas whose purity is almost 100%. However, even if the hermetic sealing is performed by using nitrogen gas, oxygen and moisture with a volume of about, for example, 0.05 to 0.20% still remain in the inner part of the package 321.

Figure 14:
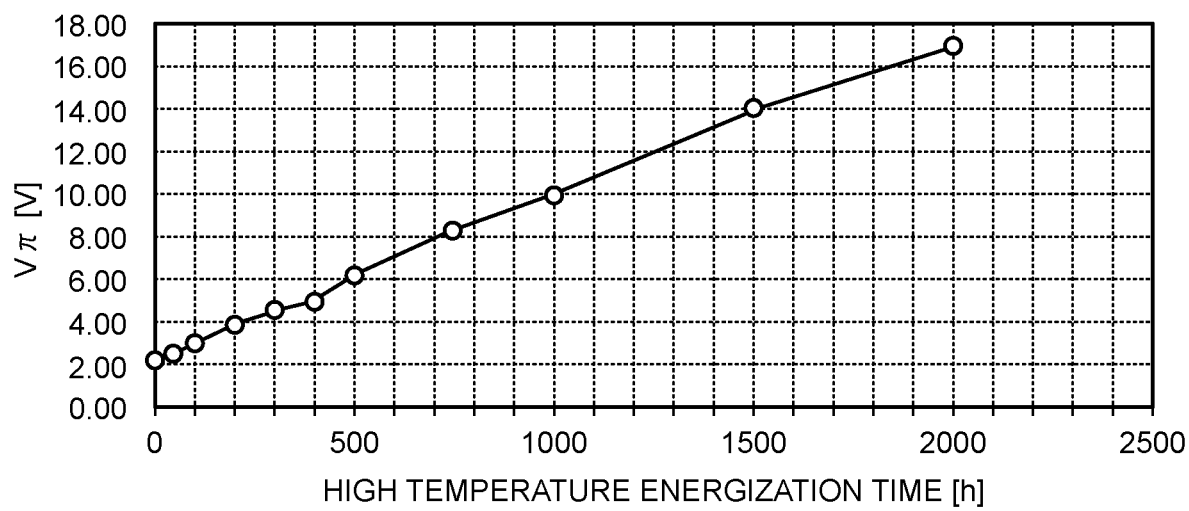
FIG. 14 is a diagram illustrating the electric characteristics of the optical integrated circuit module according to the comparative example.

FIG. 14 is a diagram illustrating the electric characteristics of the optical integrated circuit module 300 according to the comparative example. In addition, regarding the electric characteristics illustrated in FIG. 14, the horizontal axis indicates high temperature energization time (hour), and the vertical axis indicates a half wavelength voltage (V$\pi$). The half wavelength voltage is one of indicators of the electric characteristics of the optical modulator, and is a voltage that is needed to change the phase of output light by 180° ($\pi$ radian). The half wavelength voltage obtained at the time at which high temperature energization is performed under the condition of 85° C., a DC bias of 3.5 V, and an AC drive voltage of ±2.0 V while allowing light with high-intensity of 18 dBm that is needed in practical use to be transmitted through the optical integrated circuit element 320 that includes the slot waveguide that is made by using an electro-optical polymer has been measured. As a result, the half wavelength voltage is increased in accordance with a temporal change, and, when the high temperature energization time is 2000 hours, the half wavelength voltage increases more than about 7.5 times as compared to before the high temperature energization. This sort of increase in the half wavelength voltage is thought to be ascribable to a cause of a photo-oxidation phenomenon that occurs in the electro-optical polymer material. Therefore, there is a demand for an optical integrated circuit module that is able to suppress a photo-oxidation phenomenon that occurs in an electro-optical polymer material.

Accordingly, the present embodiment provides an optical integrated circuit module that is able to suppress a photo-oxidation phenomenon that occurs in an organic electro-optical material even if an optical integrated circuit element is driven while high-intensity light that is practically needed. In addition, for convenience of description, by assigning the same reference numerals to components having the same configuration, overlapping descriptions of the configuration and the operation thereof will be omitted.

(a) First Embodiment

Figure 1:
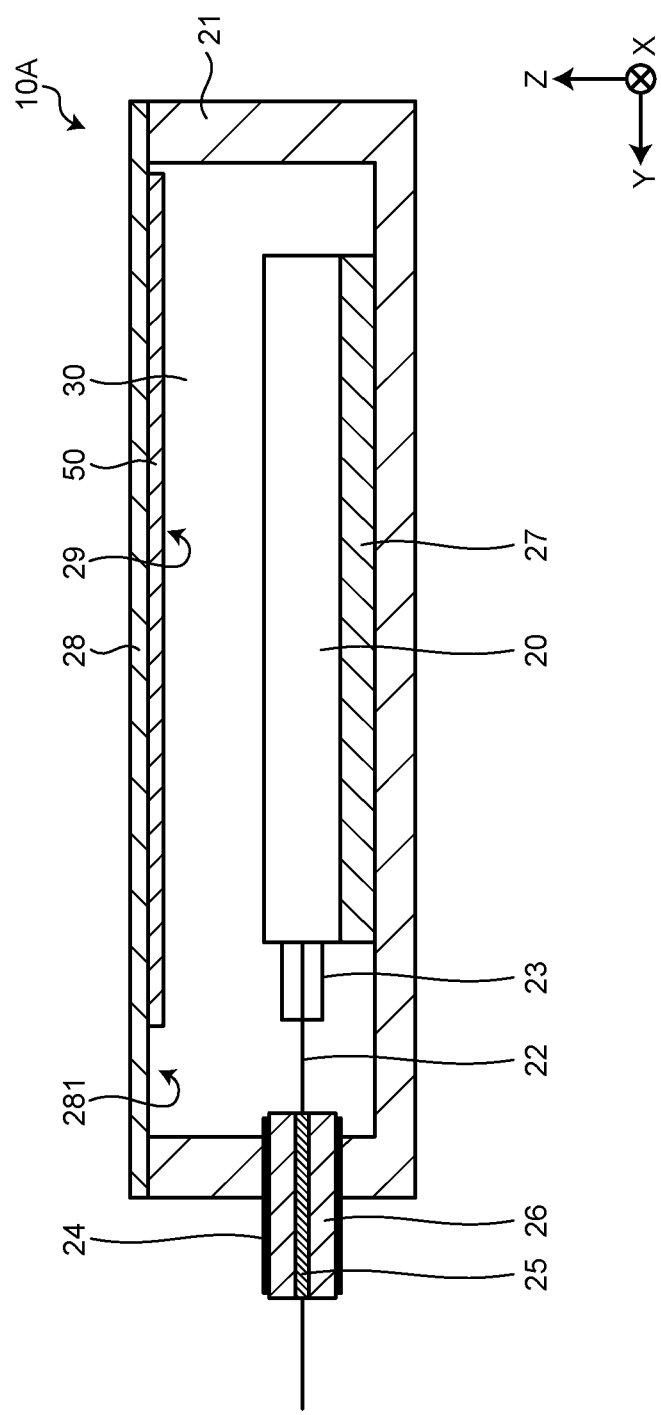
FIG. 1 is a cross-sectional schematic diagram viewed along a Y-Z plane of an optical integrated circuit module according to a first embodiment.
Figure 2:
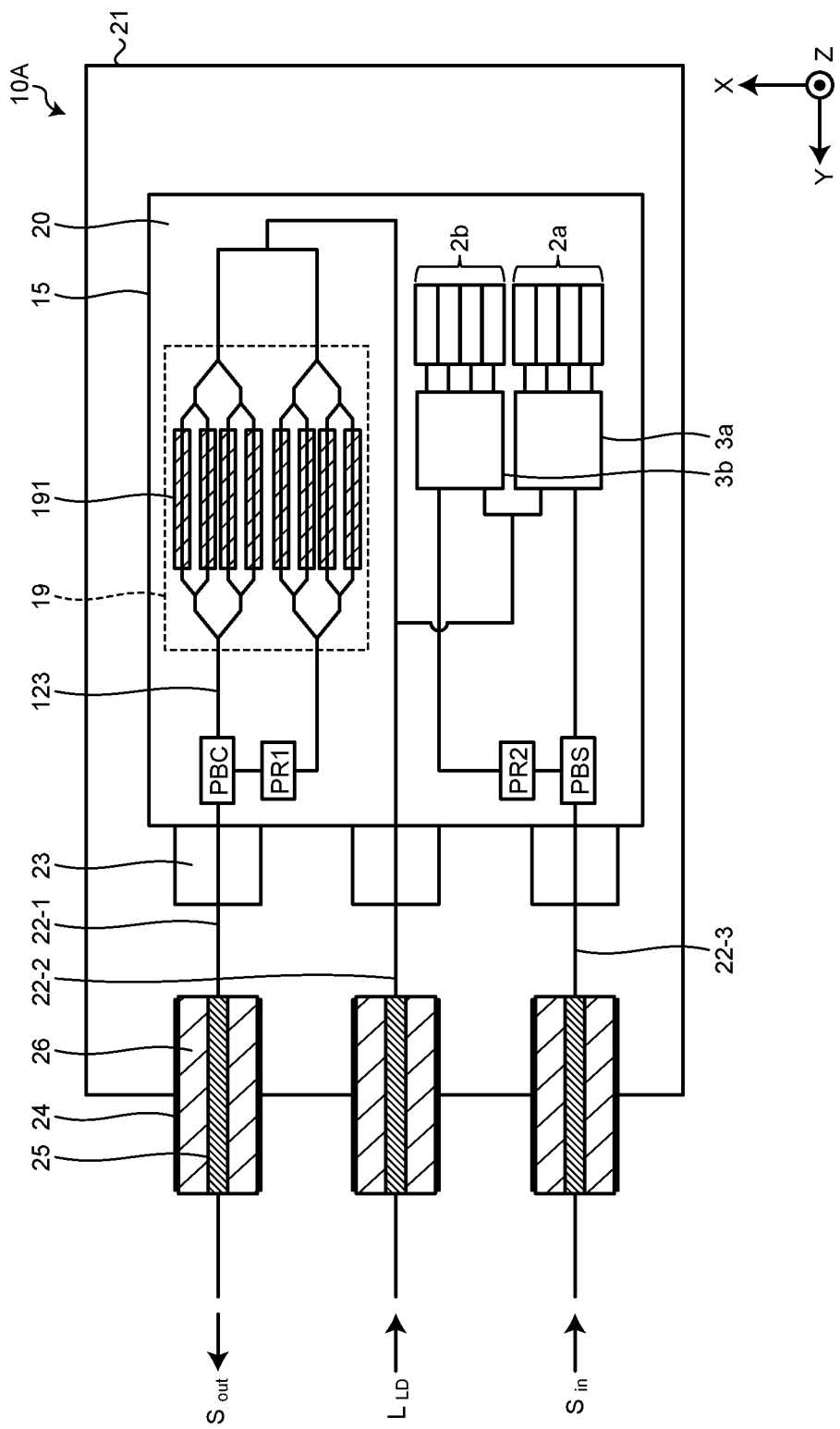
FIG. 2 is a cross-sectional schematic diagram viewed along an X-Y plane of the optical integrated circuit module illustrated in FIG. 1.

FIG. 1 is a cross-sectional schematic diagram viewed along a Y-Z plane of an optical integrated circuit module 10A according to a first embodiment, and FIG. 2 is a cross-sectional schematic diagram viewed along an X-Y plane of the optical integrated circuit module 10A illustrated in FIG. 1. The optical integrated circuit module 10A includes an optical integrated circuit element 20 that includes an optical waveguide, a package 21 that seals, as vacuum sealing, the optical integrated circuit element 20, and an oxygen getter 50 that is provided inside the package 21. The optical waveguide includes a slot waveguide 191 that is made by using, for example, an organic electro-optical material, such as an electro-optical polymer material, and a silicon waveguide 123 that is formed on the basis of, for example, silicon photonics. The optical integrated circuit module 10A includes the optical integrated circuit element 20 and an electric circuit element. In addition, the electric circuit element includes a driver that is electrically connected to, for example, an optical modulator 19, and a trans-impedance amplifier (TIA) that is electrically connected to light receiving element arrays 2a and 2b.

When referring to FIG. 1, the optical integrated circuit element 20 is secured in the package 21 by an adhesive agent 27. The package 21 is covered by a lid 28, and an inner part 30 of the package 21 is sealed at a degree of vacuum at a pressure equal to or less than $1\times10^{-1}$ Pa. The lid 28 is a cover that seals, as vacuum sealing, at least the optical waveguide that is disposed on the optical integrated circuit element 20. At the end surface of the optical integrated circuit element 20, an optical fiber 22 is connected to the optical waveguide disposed on the optical integrated circuit element 20 by a glass block 23 by using a butt joint connection technique. The glass block 23 is secured to the end surface of the optical integrated circuit element 20 by using an optical adhesive agent. The optical fiber 22 is drawn from a pipe 24 to the outside of the package 21. A portion around the optical fiber 22 is hermetically sealed by forming a metallizing unit 25 at a part of an outer circumference of the optical fiber 22, and by filling a solder material 26 having a low melting point between the pipe 24 and the metallizing unit 25.

The oxygen getter 50 is provided in the inner part 30 of the package 21. The oxygen getter 50 is provided on, for example, an inner surface 281 of the lid 28. The surface area of an oxygen adsorption layer 29 is limited, so that it may be possible to provide the plurality of oxygen getters 50 at small intervals.

The oxygen adsorption layer 29 that is used in a vacuum constituted in this way is preferably be a non-evaporable oxygen getter. As the oxygen adsorption layer 29, for example, Zr, Ti, a ZrAl alloy, a ZrNi alloy, a ZrFe alloy, a ZrVFe alloy, a ZrVE alloy (E denotes Fe, Ni, Mg, Al, or a mixture of Fe, Ni, Mg, and Al), or the like may be used. In addition, as the oxygen adsorption layer 29, for example, a ZrM1M2 alloy (M1 and M2 are selected among Cr, Mn, Fe, Co, and Ni), a ZrCoA alloy (A denotes a rare earth metal, such as Y or La, or a mixture thereof), ZrFeMgMm (Mm denotes a mixture of the rare earth metal Ce, La, and Nd), or the like may be used. These materials of the oxygen adsorption layer 29 may be directly formed on the lid 28 as a film with a thickness of 2 to 3 μm by using a physical film formation method, such as vapor deposition, or sputtering. Alternatively, the oxygen getter material described above is subjected to vapor deposition on a thin metallic sheet that is made of, for example, NiCrFe, SUS, Kovar (registered trademark), or the like, and then, the metallic sheet that has been subjected to vapor deposition may be secured to the lid 28 by spot welding or by an adhesive agent having a heat resistance property.

Before the package 21 is sealed by the lid 28 using a vacuum sealing method, it is preferable to perform activation with degas in the oxygen adsorption layer 29 that is provided on the inner surface of the lid 28. For example, degas is performed in a vacuum by the application of heat at 200° C. for 30 minutes to one hour, and subsequently, activation is performed in a vacuum at 300 to 450° C. for more than 15 minutes. After that, the interior of the package 21 in which the optical integrated circuit element 20 is adhered and secured is sealed using the vacuum sealing method at a degree of vacuum at a pressure equal to or less than $1\times10^{-1}$ Pa. At this time, by performing a seam welding process in a vacuum chamber, in which the degree of vacuum is a pressure equal to or less than $1\times10^{-1}$ Pa, such that the lid 28 is welded on to the package 21, it is possible to easily perform the vacuum sealing process at the degree of vacuum at a pressure equal to or less than $1\times10^{-1}$ Pa. In addition, in order to prevent polarization of the organic electro-optical material and deterioration of an electro-optic coefficient, a condition for seam welding needs to be set such that the temperature of a portion of the organic electro-optical material is set to at least a temperature equal to or less than 130° C., and is preferably set to a low temperature equal to or less than 110° C., which is entirely implementable on the basis of the result that has been actually obtained by the inventors. In addition, for convenience of description, the degree of vacuum in the interior of the package 21 that has been sealed as the vacuum sealing is set to a pressure equal to or less than $1\times10^{-1}$ Pa, but it is preferable to set the degree of vacuum at a pressure equal to or less than, for example, $1\times10^{-2}$ Pa.

When referring to FIG. 2, three pipes 24 are provided in the package 21, and three optical fibers 22-1, 22-2, and 22-3 are drawn from the package 21. Each of the optical fibers 22-1, 22-2, and 22-3 is connected to the associated three optical waveguides that are exposed to the end surface of the optical integrated circuit element 20 by the respective glass blocks 23 by using a butt joint connection technique. The optical integrated circuit element 20 is manufactured by using a silicon photonics technology, and is able to be applied to high-speed optical communication performed at a symbol rate equal to or higher than, for example, 130 Gbaud.

The optical integrated circuit element 20 illustrated in FIG. 2 includes the optical modulator 19 that is formed on a substrate 15 by using the optical waveguide. The optical modulator 19 is a DP-QPSK modulator that performs modulation at a symbol rate of 130 Gbaud, and is constituted in combination with a Mach-Zehnder interferometer. Among the optical waveguides that constitute the optical modulator 19, slot waveguides 191 that are made by using an electro-optical polymer material are formed in an area in which electricity and light are interact each other. The eight slot waveguides 191 are constituted by four child Mach-Zehnder interferometers SMZ1 to SMZ4 and two parent Mach-Zehnder interferometers MMZ1 and MMZ2. Each of the slot waveguides 191 and the silicon waveguides 123 is connected by a mode converter.

Figure 3A:
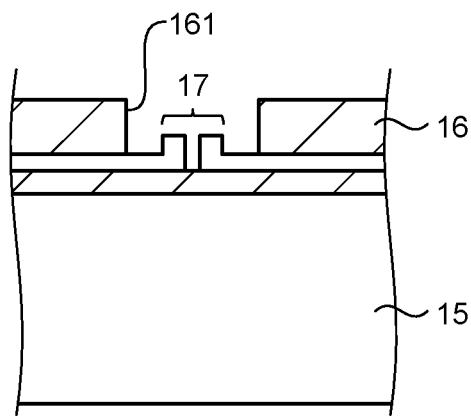
FIG. 3A is a cross-sectional schematic diagram illustrating a slot waveguide before an electro-optical polymer is filled.
Figure 3B:
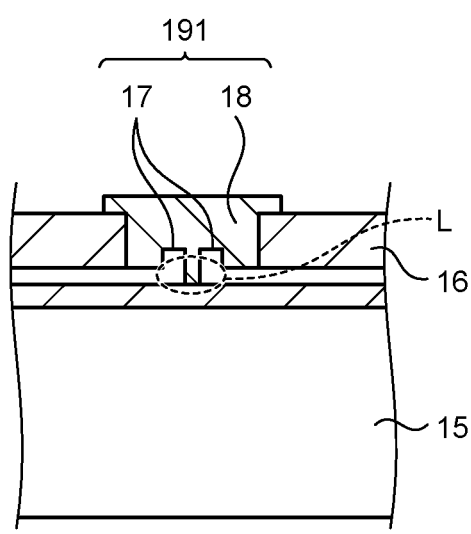
FIG. 3B is a cross-sectional schematic diagram of the slot waveguide after an electro-optical polymer has been filled.

FIG. 3A is a cross-sectional schematic diagram illustrating the slot waveguide 191 before the electro-optical polymer is filled, and FIG. 3B is a cross-sectional schematic diagram illustrating the slot waveguide 191 after the electro-optical polymer has been filled. A $SiO_2$ layer 16 is formed on the substrate 15 that is made of Si illustrated in FIG. 3A, and two electrodes 17 that are arranged closer to each other with a predetermined gap are formed in an inner part of a groove 161 that has been etched and that is located in the $SiO_2$ layer 16. The electrodes 17 are made of silicon in which, for example, impurity is added at an appropriate concentration, and a slot is formed between the two electrodes 17.

The interior of the groove 161 illustrated in FIG. 3B is filled with an electro-optical polymer 18. The inner part of the slot located between the electrodes 17 is also filled with the electro-optical polymer 18. As a result, the slot waveguide 191 is formed. A nonlinear optically active polymer disclosed in Japanese Patent No. 6935884 may also be used as the electro-optical polymer 18. By using the electro-optical polymer 18, the slot waveguide 191 exhibits favorable speed consistency between electricity and light, and is suitable for high-speed and broad-band optical transmission. Light L is confined in an area that is determined by the two electrodes 17 and propagates.

When a voltage is applied to the two electrodes 17, a refractive index n of the electro-optical polymer 18 is changed, and accordingly, an optical path length and is changed. By applying an appropriate voltage difference by using two arms of each of the Mach-Zehnder interferometers that are included in the optical modulator 19 illustrated in FIG. 2, an interference condition is changed, and thus, optical phase modulation is performed on a signal that propagates through the slot waveguides 191. In addition, it is assumed that the shape of the two electrodes 17 and the slot space have been designed such that an optical propagation loss of each of the slot waveguides 191 is low in a state in which the electro-optical polymer 18 has been filled.

The optical integrated circuit element 20 illustrated in FIG. 2 includes, in addition to the optical modulator 19, the light receiving element arrays 2a and 2b, 90° hybrid devices 3a and 3b, a polarization beam splitter PBS, a polarization beam combiner PBC, and polarization rotators PR1 and PR2. The light receiving element arrays 2a and 2b are optical receivers that include an array of, for example, Ge light receiving elements. Light LLD emitted from a laser light source that is located outside of the package 21 is incident into the optical integrated circuit element 20 after passing through the optical fiber 22-2, and some of the Light LLD is branched off and is subjected to desired optical modulation in the optical modulator 19. The laser light source is, for example, a wavelength-variable laser light source.

Regarding modulation signal light that has been output from one of the parent Mach-Zehnder interferometers denoted by MMZ2, the direction of a polarization axis of the modulation signal light is rotated by 90° by the polarization rotator PR1, and the modulation signal light is subjected to polarization combination with the modulation signal light that has been output from the other of the parent Mach-Zehnder interferometers denoted by MMZ1 by the polarization beam combiner PBC. The light that has been polarization combination is output from the optical fiber 22-1 as a DP-QPSK optical signal. In contrast, reception signal light is incident into the optical integrated circuit element 20 from the optical fiber 22-3, and is split into two pieces of polarization that are orthogonal to each other by the polarization beam splitter PBS. One of the pieces of the polarization is incident into the 90° hybrid device 3a, and the other of the pieces of polarization is incident into the 90° hybrid device 3b after the polarization axis is rotated by 90° by the polarization rotator PR2.

In contrast, the other part of the light LLD that is incident from the optical fiber 22-2 and that is branched off is incident into the 90° hybrid devices 3a and 3b as local light. The 90° hybrid devices 3a and 3b convert a phase state of the reception signal light to a light intensity by using the local light as reference light. The light intensity is detected by each of the light receiving element arrays 2a and 2b.

It is possible to easily measure an amount of leakage occurring in the package 21 that has been sealed, as vacuum sealing, on the basis of the Optical Leak Test that is defined by the MIL-STD-883, but, even if the amount of leakage is equal to or less than the limit of measurement, in some cases, a very little leakage may possibly be present. In this case, even if a very small amount of air including 21% of oxygen flows into the inner part of the package 21 caused by the very little leakage, the oxygen is absorbed by the oxygen getter 50. As a result, the inner part 30 of the package 21 is maintained in an oxygen-free condition, and thus, it is possible to suppress a photo-oxidation phenomenon.

Figure 4:
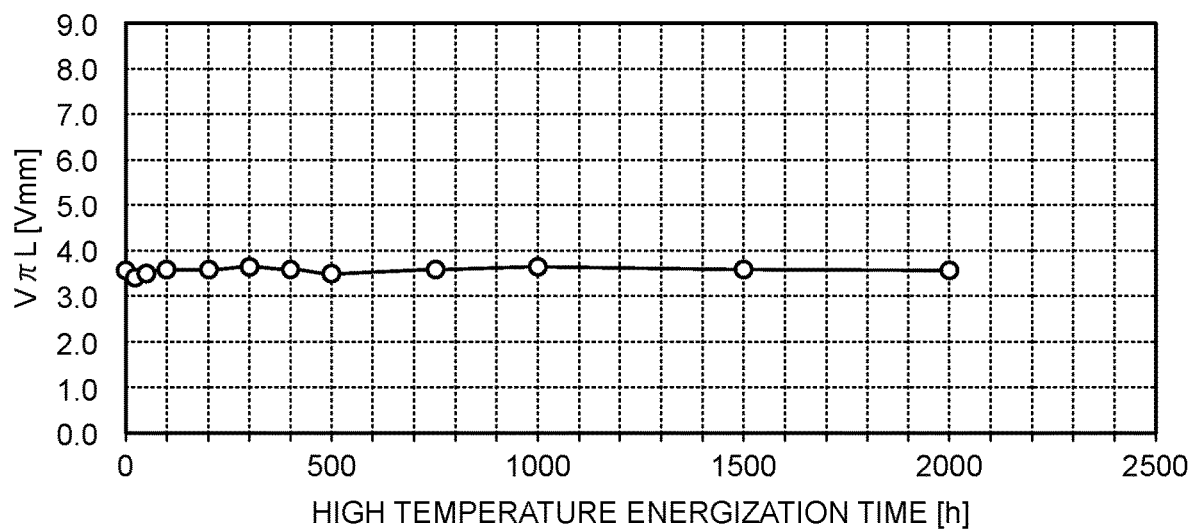
FIG. 4 is a diagram illustrating the electric characteristics of the optical integrated circuit module according to the first embodiment.

FIG. 4 is a diagram illustrating the electric characteristics of the optical integrated circuit module 10A. High temperature energization is performed under the condition of 85° C., a DC voltage of 3.5 V, and an AC voltage of ±2.0 V while allowing light with high-intensity of 18 dBm to be transmitted through the optical integrated circuit module 10A according to the first embodiment. There is little temporal change in the half wavelength voltage Vπ after an elapse of 2000 hours, and, even when compared to the optical integrated circuit module 300 according to the comparative example illustrated in FIG. 14, the difference between them is apparent. An amount of oxygen contained in the package 21 included in the optical integrated circuit module 10A according to the first embodiment is approximately zero, which is thought to be the result obtained from the suppression of the photo-oxidation phenomenon that occurs in the electro-optical polymer 18 that is the organic electro-optical material.

In the optical integrated circuit module 10A according to the first embodiment, as a result of oxygen that is contained in the inner part 30 being absorbed by the oxygen getter 50 that is provided in the package 21 that has been sealed as vacuum sealing, an amount of oxygen contained in the inner part 30 of the package 21 becomes approximately zero. As a result, it is possible to suppress the photo-oxidation phenomenon that occurs in the organic electro-optical material. In addition, by suppressing the photo-oxidation phenomenon, long-term reliability of an operation of the optical integrated circuit module 10A is maintained, and, as a result, the reliability of the optical transmitter-receiver that includes therein the optical integrated circuit module 10A built in is improved.

The package 21 has been sealed as vacuum sealing by the lid 28, and the oxygen getter 50 is secured to the inner surface of the lid 28, so that it is possible to ensure an arrangement space of the oxygen getter 50.

The degree of vacuum inside of the package 21 that has been sealed as vacuum sealing is set to a pressure equal to or less than $1\times10^{-1}$ Pa, for example, a pressure equal to or less than $1\times10^{-2}$ Pa, so that, it is possible to efficiently absorb oxygen contained in the inner part 30 of the package 21 by the oxygen getter 50.

The optical integrated circuit element 20 includes the optical modulator 19 that is constituted of the slot waveguides 191 in each of which the electro-optical polymer 18 is filled between the two electrodes 17. As a result, the oxygen getter 50 is able to absorb the oxygen contained in the package 21 in which the optical integrated circuit element 20 that includes the optical modulator 19 has been sealed as vacuum sealing, so that it is possible to suppress the photo-oxidation phenomenon that occurs in the electro-optical polymer 18.

The optical integrated circuit module 10A includes the optical integrated circuit element 20 that includes the slot waveguides 191, each of which is made by using the electro-optical polymer 18, and the electric circuit element, such as the driver and the TIA, that is electrically connected to the optical integrated circuit element 20. As a result, it is possible to provide the optical integrated circuit module 10A that is able to suppress the photo-oxidation phenomenon that occurs in the electro-optical polymer 18.

(b) Second Embodiment

Figure 5:
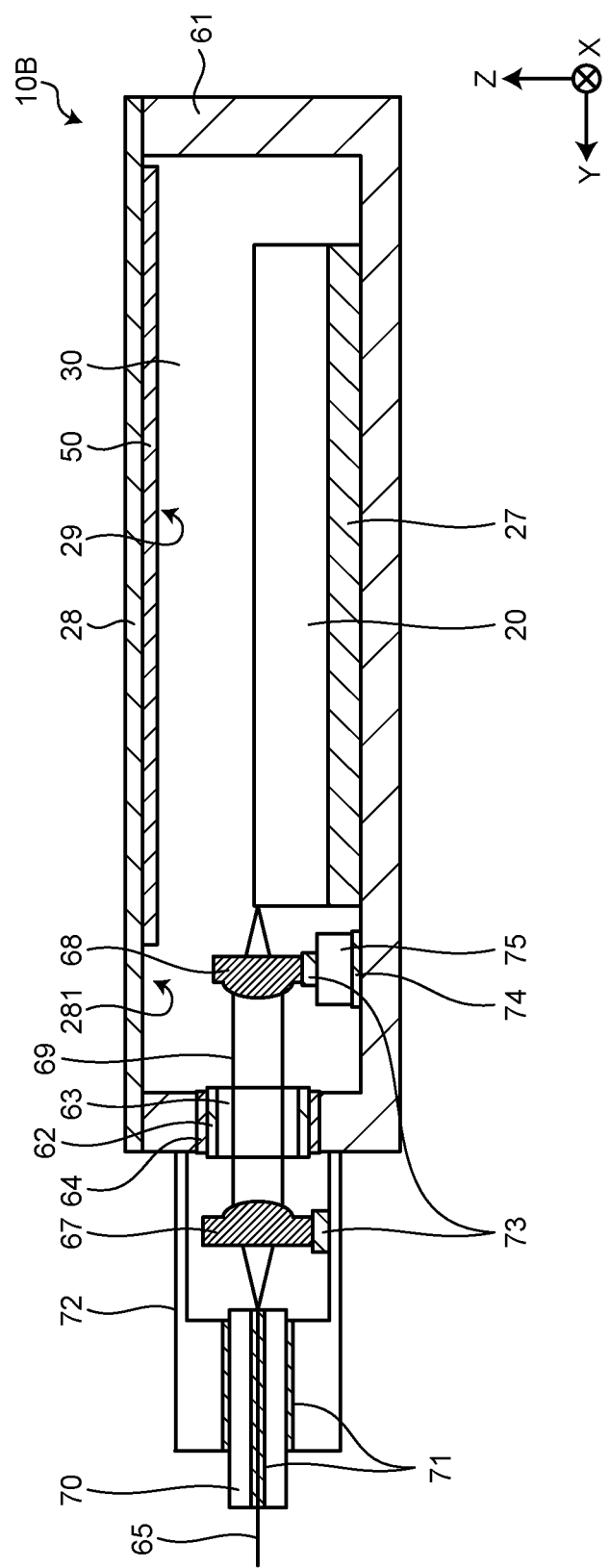
FIG. 5 is a cross-sectional schematic diagram viewed along a Y-Z plane of an optical integrated circuit module according to a second embodiment.
Figure 6:
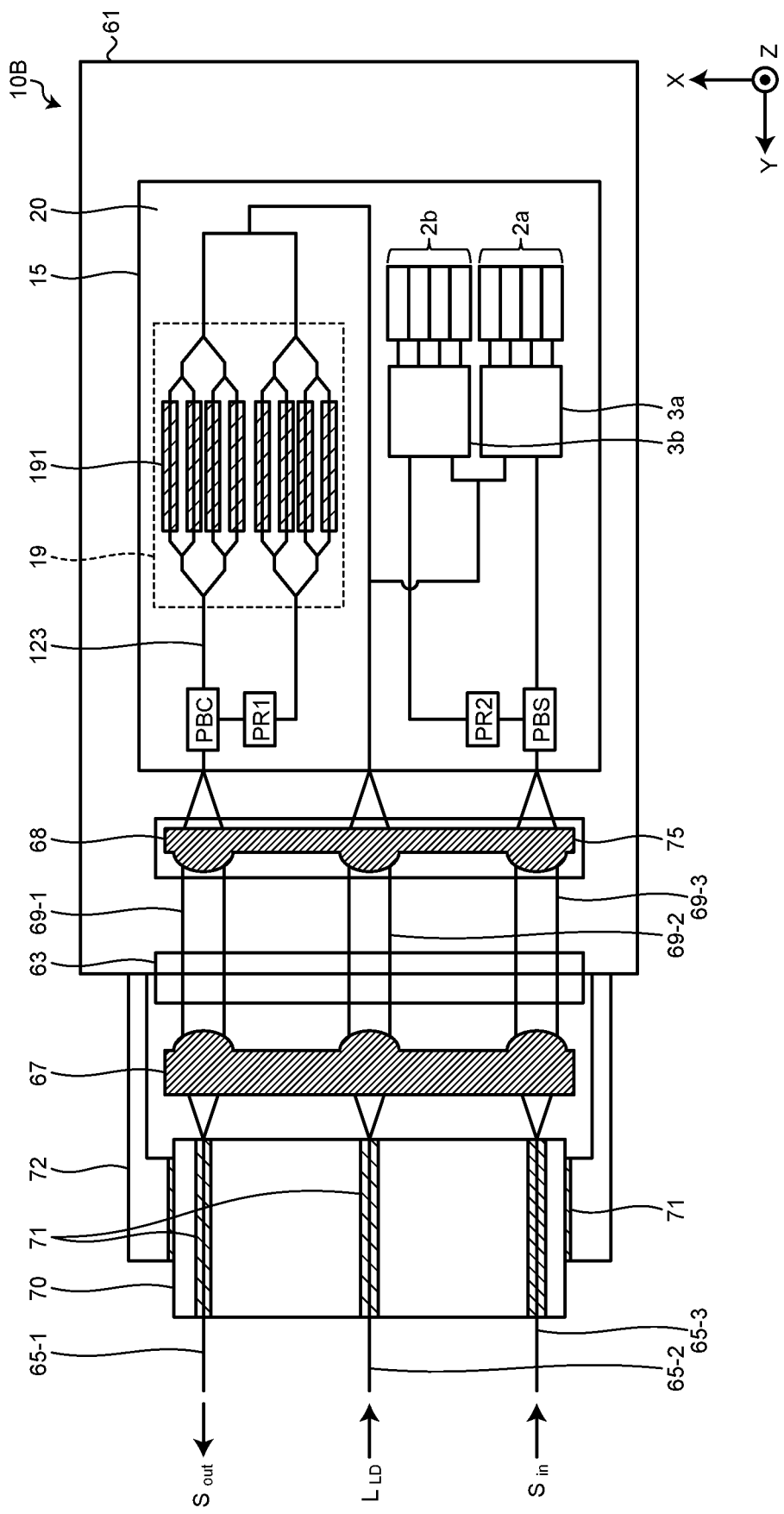
FIG. 6 is a cross-sectional schematic diagram viewed along an X-Y plane of the optical integrated circuit module illustrated in FIG. 5.

FIG. 5 is a cross-sectional schematic diagram viewed along a Y-Z plane of an optical integrated circuit module 10B according to a second embodiment, and FIG. 6 is a cross-sectional schematic diagram viewed along an X-Y plane of the optical integrated circuit module 10B illustrated in FIG. 5. In addition, by assigning the same reference numerals to components having the same configuration and operation as those in the optical integrated circuit module 10A according to the first embodiment, overlapped descriptions of the configuration and the operation thereof will be omitted.

The optical integrated circuit module 10B illustrated in FIG. 5 includes the optical integrated circuit element 20 that includes optical waveguides, a package 61 that hermetically seals the optical integrated circuit element 20, and the oxygen getter 50 that is provided inside of the package 61. In a hole that is located on one of the side surfaces of the package 61, a window 63 that is made of transparent sapphire glass and that includes a metallizing unit 62 formed around the circumference of the window 63 is mounted such that the hole is completely filled with silver solder 64, and airtightness is maintained. Pieces of input/output light that are output from an optical fiber 65 and the optical waveguides included in the optical integrated circuit element 20 become parallel light 69 by lens arrays 67 and 68, and are optically coupled each other by way of the window 63. The leading end of the optical fiber 65 is adhered and secured in the hole of a glass block 70 by an adhesive agent 71, and the glass block 70 is adhered and secured to a metal holder 72 by the adhesive agent 71. The metal holder 72 is welded and secured to the side surface of the package 61 by YAG laser welding. The lens array 67 disposed on the optical fiber 65 side is secured to the metal holder 72 by using a UV adhesive agent 73. In addition, the lens array 68 disposed on the optical integrated circuit element 20 side is adhered and secured on a lens array board 75, which is secured on the bottom surface of the package 61 by using an adhesive agent 74, by using the UV adhesive agent 73.

When referring to FIG. 6, three optical fibers 65-1, 65-2, and 65-3 are installed in the package 61. The input/output light that is output from each of the optical fibers 65-1, 65-2, and 65-3 and the input/output light that is output from the three optical waveguides included in the optical integrated circuit element 20 become pieces of parallel light 69-1, 69-2, and 69-3 by the lens arrays 67 and 68, and are optically coupled each other by way of the window 63.

In the optical integrated circuit module 10B according to the second embodiment, as a result of oxygen that is contained in the inner part 30 being absorbed by the oxygen getter 50 that is provided in the package 61 that has been sealed as vacuum sealing, an amount of oxygen contained in the inner part 30 of the package 61 becomes approximately zero. As a result, it is possible to suppress the photo-oxidation phenomenon that occurs in the organic electro-optical material. In addition, by suppressing the photo-oxidation phenomenon, long-term reliability of an operation of the optical integrated circuit module 10B is maintained, and, as a result, the reliability of the optical transmitter-receiver that includes therein the optical integrated circuit module 10B built in is improved.

The package 61 has been sealed as vacuum sealing by the lid 28, and the oxygen getter 50 is secured to the inner surface of the lid 28, so that it is possible to ensure an arrangement space of the oxygen getter 50.

The degree of vacuum of inside of the package 61 that has been sealed as vacuum sealing is at a pressure equal to or less than $1\times10^{-1}$ Pa, that is, for example, at a pressure equal to or less than $1\times10^{-2}$ Pa, so that, in the oxygen getter 50, it is possible to efficiently absorb oxygen contained in the inner part 30 of the package 61.

The optical integrated circuit element 20 includes the optical modulator 19 that is constituted of the slot waveguides 191 in each of which the electro-optical polymer 18 is filled between the two electrodes 17. As a result, the oxygen getter 50 is able to absorb the oxygen contained in the package 61 in which the optical integrated circuit element 20 that includes the optical modulator 19 has been sealed as vacuum sealing, so that it is possible to suppress the photo-oxidation phenomenon that occurs in the electro-optical polymer 18.

The optical integrated circuit module 10B includes the optical integrated circuit element 20 that includes the slot waveguides 191 each of which is made by using the electro-optical polymer 18, and the electric circuit element, such as the driver and the TIA, that is electrically connected to the optical integrated circuit element 20. As a result, it is possible to provide the optical integrated circuit module 10B that is able to suppress the photo-oxidation phenomenon that occurs in the electro-optical polymer 18.

In addition, in the optical integrated circuit module 10A according to the first embodiment, a case has been described as an example in which oxygen contained in the inner part 30 is absorbed by the oxygen getter 50 that is provided in the package 61 that accommodates the entirety of the optical integrated circuit element 20. However, the example is not limited to the entirety of the optical integrated circuit element 20, but it may be possible to absorb oxygen contained in a section of the slot waveguides 191 that are included in the optical modulator 19 disposed inside of the optical integrated circuit element 20, and an embodiment thereof will be described as a third embodiment.

(c) Third Embodiment

Figure 7:
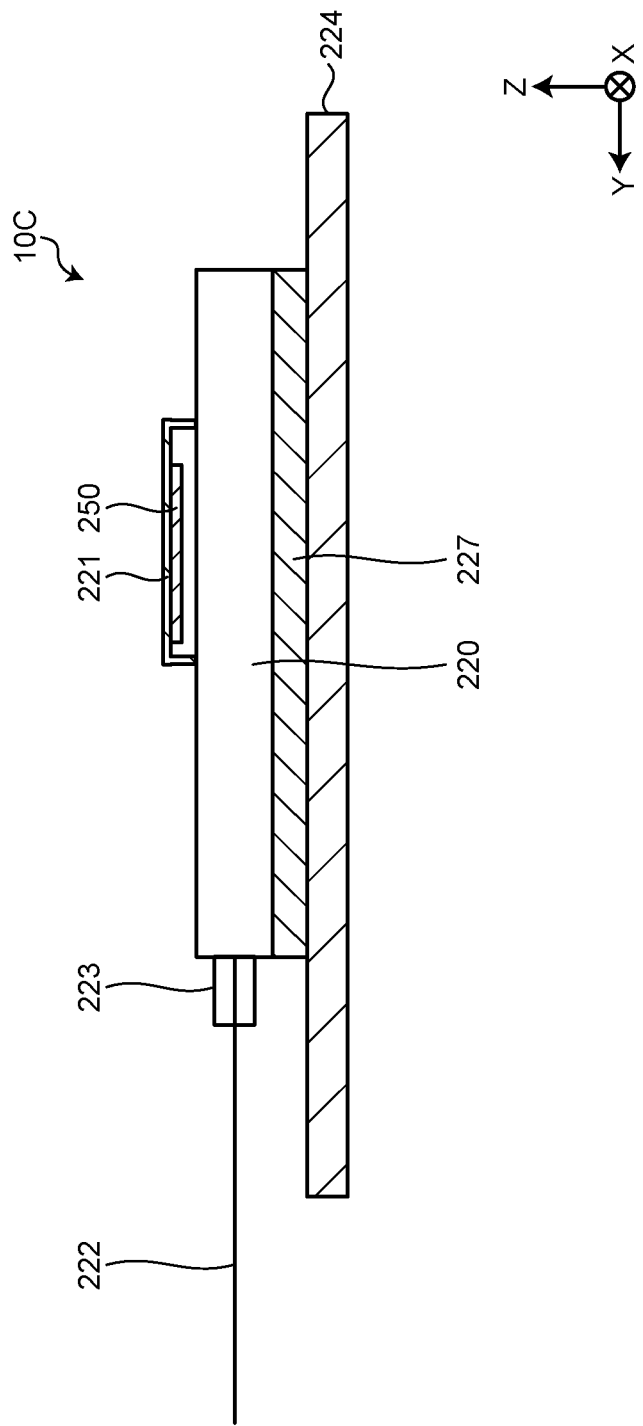
FIG. 7 is a cross-sectional schematic diagram viewed along a Y-Z plane of an optical integrated circuit module according to a third embodiment.
Figure 8:
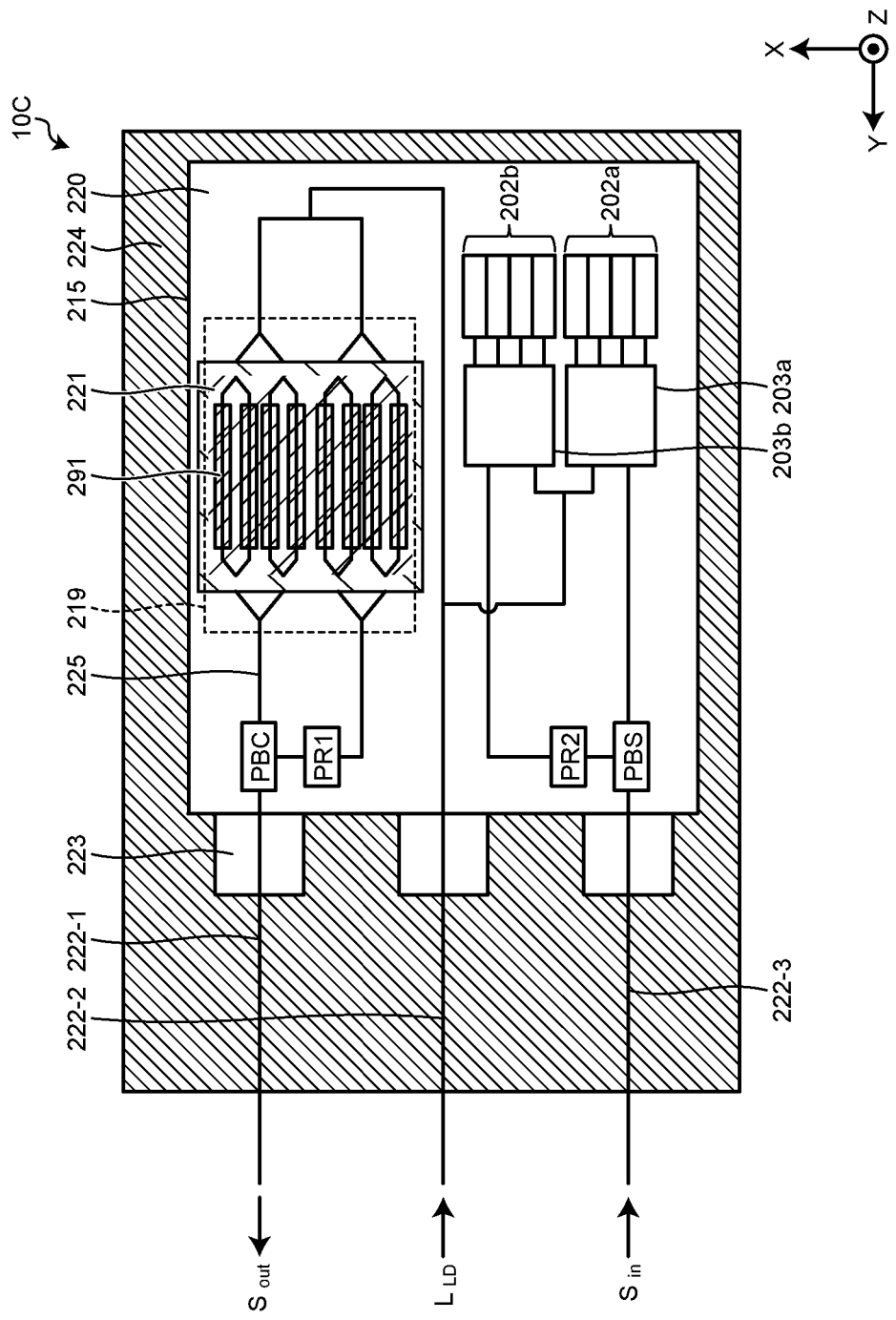
FIG. 8 is a cross-sectional schematic diagram viewed along an X-Y plane of the optical integrated circuit module illustrated in FIG. 7.
Figure 9:
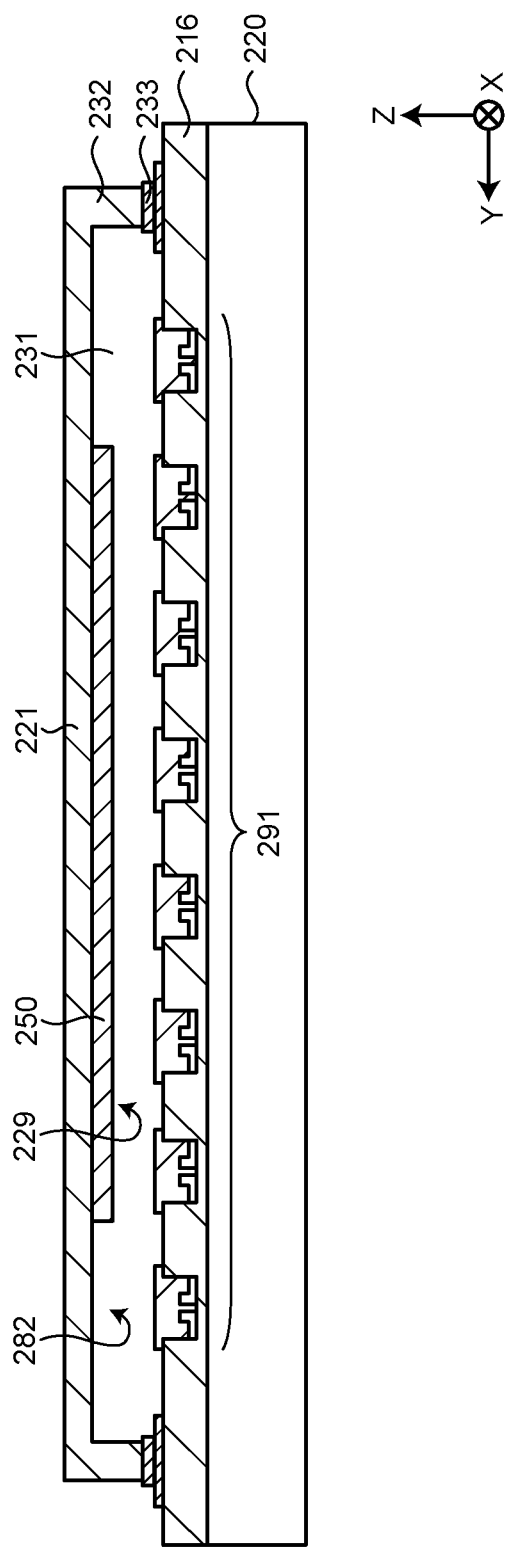
FIG. 9 is a cross-sectional schematic diagram illustrating a slot waveguide and a cap.

FIG. 7 is a cross-sectional schematic diagram viewed along a Y-Z plane of an optical integrated circuit module 10C according to the third embodiment, FIG. 8 is a cross-sectional schematic diagram viewed along an X-Y plane of the optical integrated circuit module 10C illustrated in FIG. 7, and FIG. 9 is a cross-sectional schematic diagram illustrating slot waveguides 291 and a cap 221. The optical integrated circuit module 10C includes an optical integrated circuit element 220 that includes the optical waveguides, and a cap 221 that locally seals, as vacuum sealing, a section of the optical waveguides each of which is made by using an organic electro-optical material and that is included in the optical integrated circuit element 220. In addition, the optical integrated circuit module 10C includes an oxygen getter 250 that is provided inside of the cap 221. The optical waveguide includes the slot waveguides 291 each of which are made by using, for example, an organic electro-optical material, such as an electro-optical polymer material, and the silicon waveguide 225 that is formed based on, for example, silicon photonics.

The optical integrated circuit module 10C includes the optical integrated circuit element 220 and an electric circuit element. The electric circuit element includes a driver that is electrically connected to, for example, an optical modulator 219, 90° hybrid devices 203a and 203b, and a trans-impedance amplifier (TIA) that is electrically to light receiving element arrays 202a and 202b.

When referring to FIG. 7, the optical integrated circuit element 220 is secured onto a metal base 224 by using an adhesive agent 227. The cap 221 that locally seals, as vacuum sealing, a section of the optical waveguide that is included in the optical integrated circuit element 220 and that is made by using an organic electro-optical material is sealed such that the inner part of a recess 231 remains in a vacuum state at a pressure equal to or less than $1\times10^{-1}$ Pa. The cap 221 is a cover that seals, as vacuum sealing, at least the optical waveguide that is disposed on the optical integrated circuit element 220. At the end surface of the optical integrated circuit element 220, an optical fiber 222 is connected to the optical waveguide located on the optical integrated circuit element 220 by a glass block 223 by using a butt joint connection technique. The glass block 223 is secured to the end surface of the optical integrated circuit element 220 by using an optical adhesive agent.

The oxygen getter 250 is provided in the inner part of the cap 221. The oxygen getter 250 is provided on the inner surface of, for example, the cap 221.

When referring to FIG. 8, three optical fibers 222-1, 222-2, and 222-3 are drawn out from the optical integrated circuit module 10C. Each of the optical fibers 222-1, 222-2, and 222-3 is connected to the associated three optical waveguides that are exposed to the end surface of the optical integrated circuit element 220 by the respective glass blocks 223 by using a butt joint connection technique. The optical integrated circuit element 220 is manufactured by using a silicon photonics technology, and is able to be applied to high-speed optical communication performed at a symbol rate equal to or higher than 130 Gbaud.

The optical integrated circuit element 220 illustrated in FIG. 8 includes the optical modulator 219 that is constituted by an optical waveguide and that is disposed on a substrate 215. The optical modulator 219 is a DP-QPSK modulator that performs modulation at a symbol rate of 130 Gbaud, and is constituted in combination with a Mach-Zehnder interferometer. Among the optical waveguides that constitute the optical modulator 219, the slot waveguides 291 that are made by using an electro-optical polymer material are formed in an area in which electricity and light are interact each other. The eight slot waveguides 291 are constituted by four child Mach-Zehnder interferometers SMZ1 to SMZ4 and two parent Mach-Zehnder interferometers MMZ1 and MMZ2. Each of the slot waveguides 291 and the silicon waveguides 225 is connected by a mode converter.

When referring to FIG. 9, the oxygen getter 250 is provided in the inner part of the cap 221 that locally seals, as vacuum sealing, a section of the slot waveguides 291 each of which is made by using the organic electro-optical material. The oxygen getter 250 is provided on an inner surface 282 of, for example, the cap 221. The surface area of the oxygen adsorption layer 229 in which the oxygen getter 250 is disposed is limited, so that it may be possible to provide the plurality of oxygen getters 250 at small intervals.

The cap 221 includes a bonding portion 232 that is formed in a square frame shape and that is used for bonding to the optical integrated circuit element 220. A SiO$_2$ layer 216 that is disposed on the top surface of the optical integrated circuit element 220 is bonded by a bonding film 233. The material of the cap 221 used may be, for example, a metal, a semiconductor, a dielectric material, an insulator, or the like, and it is possible to use Si that has achieved actual result in, for example, Micro Electro Mechanical Systems (MEMS), or the like. In a case of Si, it is possible to easily form the recess 231 included in the cap by using an etching process.

Figure 10:
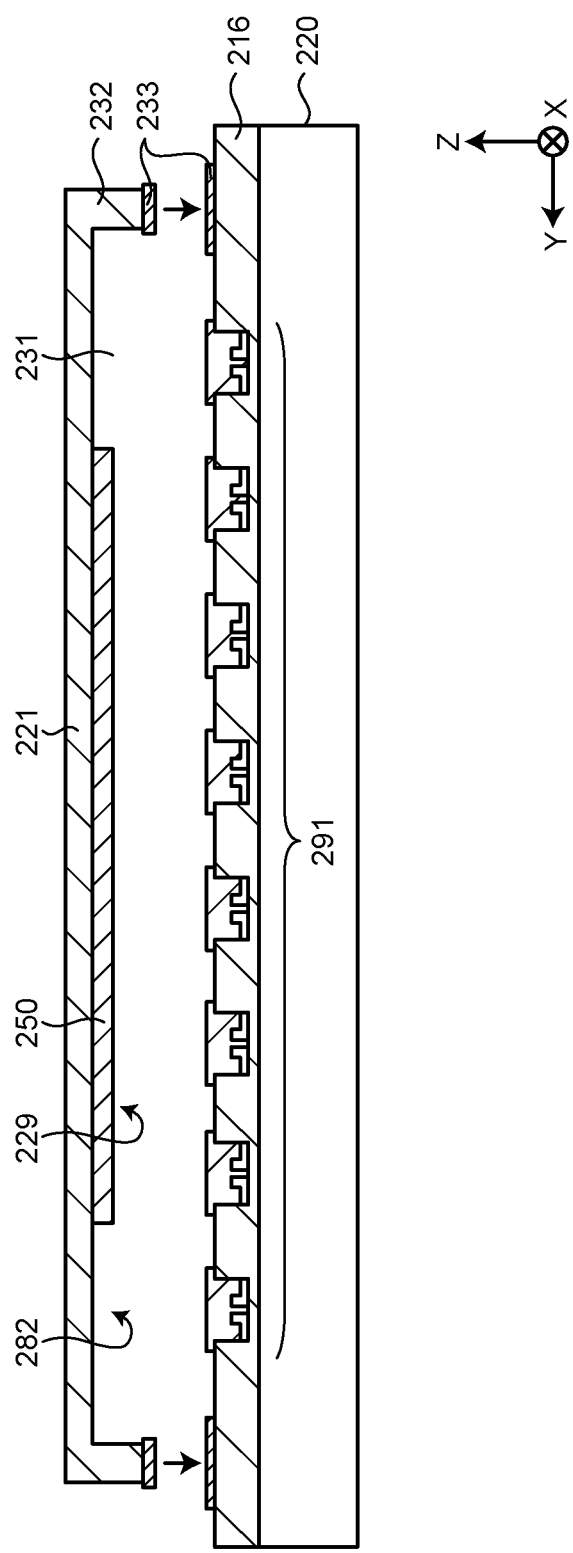
FIG. 10 is a cross-sectional schematic diagram explaining a manufacturing method that is used when the cap illustrated in FIG. 9 is bonded to an optical integrated circuit element.

FIG. 10 is a cross-sectional schematic diagram explaining a manufacturing method used when the cap 221 illustrated in FIG. 9 is bonded to the optical integrated circuit element 220. At the time of bonding performed on both of the bonding portion 232 of the cap 221 and the SiO$_2$ layer 216 that is disposed on the top surface of the optical integrated circuit element 220, after the top surface has been cleaned in a vacuum, the top surface is compressed in a vacuum, is bonded at a temperature equal to or less than 130° C., and is preferably bonded at a low temperature equal to or less than 110° C., and is then sealed, as vacuum sealing, at a pressure equal to or less than $1\times10^{-1}$ Pa. In anodic bonding that is generally used as a bonding method, the applied temperature is about 400° C., and is at least a temperature equal to or higher than 300° C. or above, so that anodic bonding is not able to be used because polarization of an organic electro-optical material and degradation of an electro-optic coefficient occur.

Accordingly, for example, by using a technique, such as Surface Activated room temperature Bonding (SAB), Atomic Diffusion Bonding (ADB), and Fast Atom Bombardment (FAB), the bonding process is performed on a portion of the organic electro-optical material at a temperature equal to or less than 130° C., and preferably at a low temperature equal to or less than 110° C. In addition, in order to obtain sufficient bonding strength, the bonding film 233 is formed, in advance before the bonding process, on both of the bonding surface of the bonding portion 232 and the bonding surface of the SiO$_2$ layer 216 that is disposed on the top surface of the optical integrated circuit element 220. Here, it is possible to use, as the bonding film 233, for example, a metal film made of Au/Ti or the like, a metal oxide film made of Ta$_2$O$_5$ or the like, a Si film, or the like.

Figure 11:
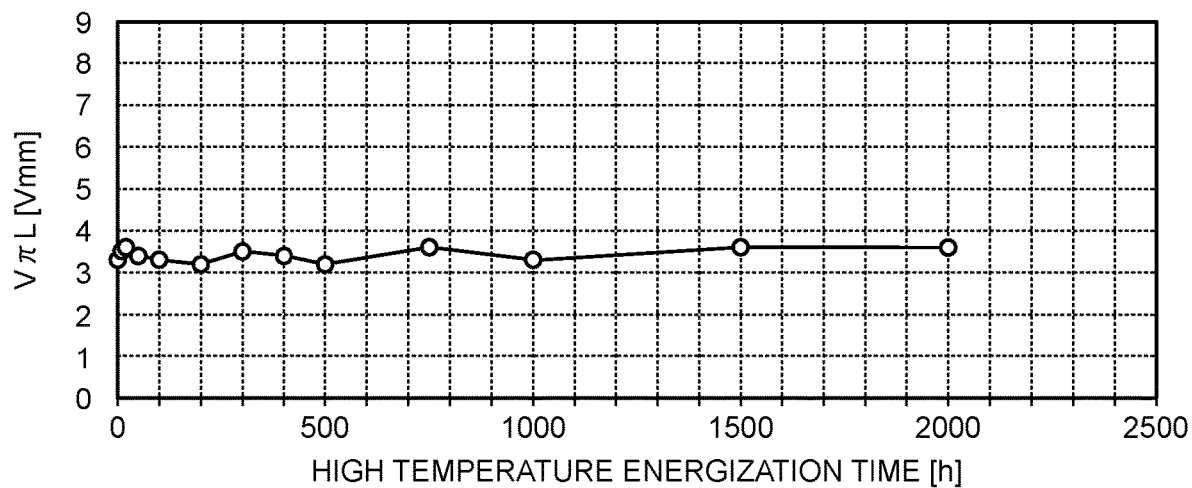
FIG. 11 is a diagram illustrating the electric characteristics of the optical integrated circuit module according to the third embodiment.

FIG. 11 is a diagram illustrating the electric characteristics of the optical integrated circuit module 10C according to the third embodiment. High temperature energization is performed under the condition of 85° C., a DC voltage of 3.5 V, and an AC voltage of ±2.0 V while allowing light with high-intensity of 18 dBm to be transmitted through the optical integrated circuit module 10C according to the third embodiment. There is little temporal change in the half wavelength voltage Vπ after an elapse of 2000 hours, and, even when compared to the optical integrated circuit module 300 according to the comparative example illustrated in FIG. 14, the difference between them is apparent. An amount of oxygen contained in the cap 221 included in the optical integrated circuit module 10C according to the third embodiment is approximately zero, which is thought to be the result obtained from the suppression of the photo-oxidation phenomenon that occurs in the electro-optical polymer 18 that is the organic electro-optical material.

In the optical integrated circuit module 10C according to the third embodiment, as a result of oxygen that is contained in the cap 221 being absorbed by the oxygen getter 250 included in the cap 221 that locally performs vacuum sealing on the slot waveguides 291 that are included in the optical modulator 219, an amount of oxygen contained in the cap 221 becomes approximately zero. As a result, it is possible to suppress the photo-oxidation phenomenon that occurs in the organic electro-optical material. In addition, by suppressing the photo-oxidation phenomenon, long-term reliability of an operation of the optical integrated circuit module 10C is maintained, and, as a result, the reliability of the optical transmitter-receiver that includes therein the optical integrated circuit module 10C built in is improved.

The degree of vacuum inside the cap 221 that has been sealed as vacuum sealing is set to a pressure equal to or less than $1\times10^{-1}$ Pa, for example, a pressure equal to or less than $1\times10^{-2}$ Pa, so that, in the oxygen getter 250, it is possible to efficiently absorb oxygen contained in the recess 231 included in the cap 221.

For example, the bonding process is performed, by using a technique, such as SAB, ADB, and FAB, on a portion of the electro-optical polymer at a temperature equal to or less than 130° C., and preferably at a low temperature equal to or less than 110° C., so that it is possible to suppress the influence exerted on the portion of the electro-optical polymer at the time of the bonding process.

The optical integrated circuit element 20 includes the optical modulator 19 that is constituted by the slot waveguides 191 in each of which the electro-optical polymer 18 is filled between the two electrodes 17. As a result, the oxygen getter 50 is able to absorb the oxygen contained in the cap 221 in which the optical integrated circuit element 20 that includes the optical modulator 19 has been sealed as vacuum sealing, so that it is possible to suppress the photo-oxidation phenomenon that occurs in the electro-optical polymer 18.

The optical integrated circuit module 10C includes the optical integrated circuit element 20 that includes the slot waveguides 191 each of which is made by using the electro-optical polymer 18, and the electric circuit element, such as the driver and the TIA, that is electrically connected to the optical integrated circuit element 20. As a result, it is possible to provide the optical integrated circuit module 10C that is able to suppress the photo-oxidation phenomenon that occurs in the electro-optical polymer 18.

Application of Optical Transmitter-Receiver

Figure 12:
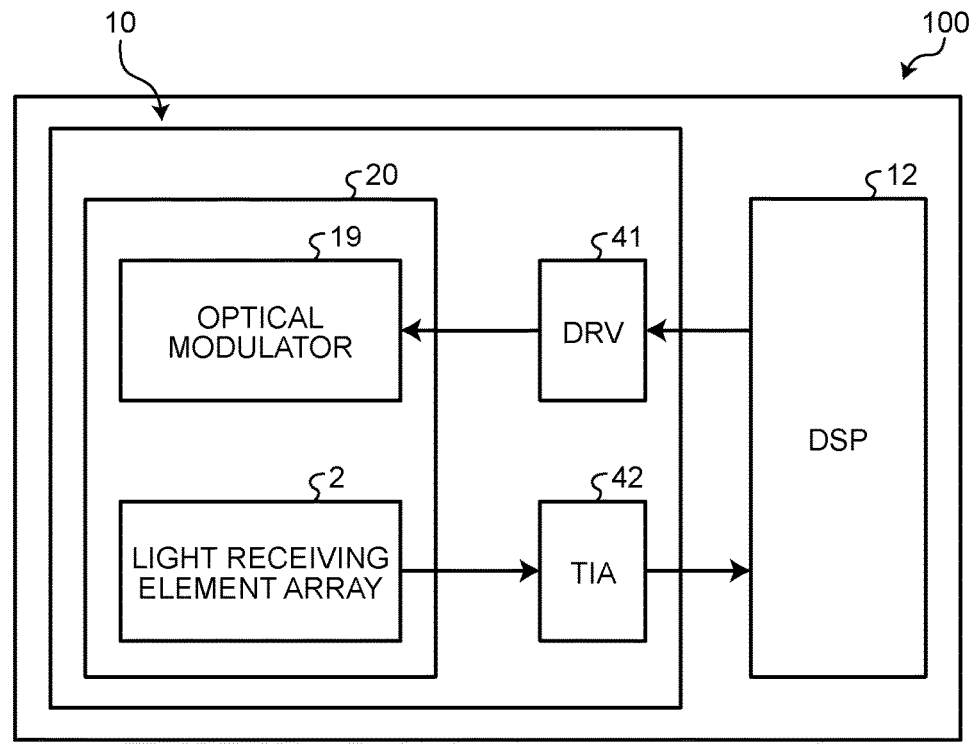
FIG. 12 is a schematic diagram illustrating an optical transmitter-receiver.

FIG. 12 is a schematic diagram illustrating an optical transmitter-receiver 100. The optical transmitter-receiver 100 illustrated in FIG. 12 is an optical communication apparatus that includes the optical integrated circuit module 10, and a digital signal processor (DSP) 12 that is electrically connected to the optical integrated circuit module 10. The optical integrated circuit module 10 includes the optical integrated circuit element 20 in which an optical waveguide that is made by using an organic electro-optical material is formed, and an electric circuit element that includes a driver (DRV) 41 and a trans-impedance amplifier (TIA) 42. The optical integrated circuit element 20 includes the optical modulator (MOD) 19, and a light receiving element array 2. The optical modulator 19 is formed by a slot waveguide that is made by using an electro-optical polymer. The light receiving element array 2 is, for example, a Ge doped PD array.

The DSP 12 performs a modulation process and a demodulation process on a transmission signal by using a technique used in, for example, multilevel modulation, such as DP-QPSK modulation. The modulation electrical signal received from the DSP 12 is input to the driver 41, and the modulation electrical signal is amplified by the driver 41. Light passing through the optical modulator 19 is modulated by the amplified modulation electrical signal.

On the reception side, the received light reception signal is converted to an electrical signal by the light receiving element array 2 and is amplified by the TIA 42, and then, the amplified electrical signal is subjected to the demodulation process by the DSP 12.

For example, the interior of the package 21 (61) included in the optical integrated circuit module 10 is sealed, as vacuum sealing, and, in addition, the oxygen getter 50 is provided and oxygen contained in the package 21 (61) is absorbed by the oxygen getter 50, so that an amount of oxygen contained in the package 21 (61) becomes approximately zero. As a result, it is possible to suppress the photo-oxidation phenomenon that occurs in the organic electro-optical material that is used by the optical integrated circuit element 20. In addition, by suppressing the photo-oxidation phenomenon, long-term reliability of an operation of the optical integrated circuit module 10 is maintained, and, as a result, the reliability of the optical transmitter-receiver 100 that includes therein the optical integrated circuit module 10 built in is improved.

For example, the interior of the cap 221 included in the optical integrated circuit module 10 is sealed, as vacuum sealing, and, in addition, the oxygen getter 50 is provided and oxygen contained in the inner part of the cap 221 is absorbed by the oxygen getter 50, so that an amount of oxygen contained in the inner part of the cap 221 becomes approximately zero. As a result, it is possible to suppress the photo-oxidation phenomenon that occurs in the organic electro-optical material that is used by the optical integrated circuit element 20. In addition, long-term reliability of an operation of the optical integrated circuit module 10 is maintained, and, as a result, the reliability of the optical transmitter-receiver 100 that includes therein the optical integrated circuit module 10 built in is improved.

In the above, the embodiments has been described based on specific configuration examples, and the present disclosure is not limited to the configuration examples described above. A part or all of the configurations described in the first to the third embodiments can be used in any appropriate combination as long as they do not conflict with each other.

According to an aspect of an embodiment, an optical integrated circuit module is able to suppress a photo-oxidation phenomenon that occurs in an organic electro-optical material.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical integrated circuit module comprising:
   an optical integrated circuit element that includes an optical waveguide that is made by using an organic electro-optical material;
   a cover that is a cap that forms a vacuum seal of at least the optical waveguide that is disposed on the optical integrated circuit element; and
   an oxygen getter that is provided in an inner part of the cover and that absorbs oxygen contained in the inner part of the cover,
   wherein the vacuum seal is such that a temperature of the organic electro-optical material has been equal to or less than 110° C. at a time of a bonding process in which the optical waveguide was bonded by the cover.

2. The optical integrated circuit module according to claim 1, wherein
   the optical integrated circuit element is accommodated in a package, and
   the cover is a lid of the package.

3. The optical integrated circuit module according to claim 1, wherein the oxygen getter is secured to the cover.

4. The optical integrated circuit module according to claim 3, wherein the oxygen getter includes an oxygen adsorption layer that is formed on an inner surface of the cover.

5. The optical integrated circuit module according to claim 1, wherein a degree of vacuum of the vacuum seal in the cover is a pressure equal to or less than $1 \times 10^{-1}$ Pa.

6. The optical integrated circuit module according to claim 1, wherein the vacuum seal results from at least one bonding process among bonding processes including surface activated room temperature bonding (SAB), atomic diffusion bonding (ADB), and fast atom bombardment (FAB).

7. The optical integrated circuit module according to claim 1, wherein the optical integrated circuit element includes an optical modulator that is constituted by a slot waveguide in which the organic electro-optical material is filled between two electrodes.

8. The optical integrated circuit module according to claim 1, wherein the oxygen getter includes an oxygen adsorption material that is selected from among Zr, Ti, a ZrAl alloy, a ZrNi alloy, a ZrFe alloy, a ZrVFe alloy, a ZrVE alloy (E denotes Fe, Ni, Mg, or Al, or a mixture of Fe, Ni, Mg, and Al), a ZrM1M2 alloy (M1 and M2 are selected from among Cr, Mn, Fe, Co, and Ni), a ZrCoA alloy (A denotes a rare earth metal, such as Y or La, or a mixture of Y and La), and ZrFeMgMm (Mm denotes a mixture of a rare earth metal, Ce, La, and Nd).

9. The optical integrated circuit module according to claim 1, wherein the optical integrated circuit module further includes an electric circuit element that is electrically connected to the optical integrated circuit element.

10. An optical communication apparatus comprising:
a processor that executes signal processing on an electrical signal; and
an optical integrated circuit module that has a structure in which optical modulators each of which modulates light generated from a light source by using an electrical signal that is output from the processor are integrated, wherein
the optical integrated circuit module includes
an optical integrated circuit element that includes an optical waveguide that is made by using an organic electro-optical material,
a cover that is a cap that forms a vacuum seal of at least the optical waveguide that is included in the optical integrated circuit element, and
an oxygen getter that is provided in an inner part of the cover and that absorbs oxygen contained in the inner part of the cover,
wherein the vacuum seal is such that a temperature of the organic electro-optical material has been equal to or less than 110° C. at a time of a bonding process in which the optical waveguide was bonded by the cover.

11. The optical communication apparatus according to claim 10, wherein the optical integrated circuit module has a structure in which optical receivers each of which demodulates reception light by using light that is generated from the light source are integrated.

* * * * *